United States Patent
Paulson et al.

(10) Patent No.: US 7,039,064 B1
(45) Date of Patent: May 2, 2006

(54) PROGRAMMABLE TRANSMISSION AND RECEPTION OF OUT OF BAND SIGNALS FOR SERIAL ATA

(75) Inventors: Christopher D. Paulson, Ft. Collins, CO (US); Steven A. Schauer, Loveland, CO (US)

(73) Assignee: LSI Logic Corporation, Milpitas, CA (US)

( * ) Notice: Subject to any disclaimer, the term of this patent is extended or adjusted under 35 U.S.C. 154(b) by 923 days.

(21) Appl. No.: 10/071,718

(22) Filed: Feb. 8, 2002

(51) Int. Cl.
*H04J 3/14* (2006.01)

(52) U.S. Cl. ..................................... 370/459
(58) Field of Classification Search ............... 370/458, 370/459, 522
See application file for complete search history.

(56) References Cited

U.S. PATENT DOCUMENTS

2002/0071511 A1* 6/2002 Jo et al. ..................... 375/376

2002/0110142 A1* 8/2002 Ophir et al. ................. 370/445
2002/0167930 A1* 11/2002 Pearl ........................... 370/345

OTHER PUBLICATIONS

"Serial ATA: High Speed Serialized AT Attachment", Revision 1.0, Aug. 29, 2001, pp. 1-307.

* cited by examiner

*Primary Examiner*—Melvin Marcelo
(74) *Attorney, Agent, or Firm*—Christopher P. Maiorana, P.C.

(57) ABSTRACT

An apparatus generally comprising a plurality of writeable registers, a control circuit, and a transmitter circuit. The writeable registers may be configured to store (i) a first burst value and (ii) a first gap value. The control circuit may be configured to generate an idle signal (i) in a transmit state for a first duration determined by the first burst value and (ii) in an idle state for a second duration determined by the first gap value in response to a first command signal. The transmitter circuit may be configured to (i) enable transmitting while the idle signal is in the transmit state and (ii) disable transmitting while the idle signal is in the idle state.

20 Claims, 6 Drawing Sheets

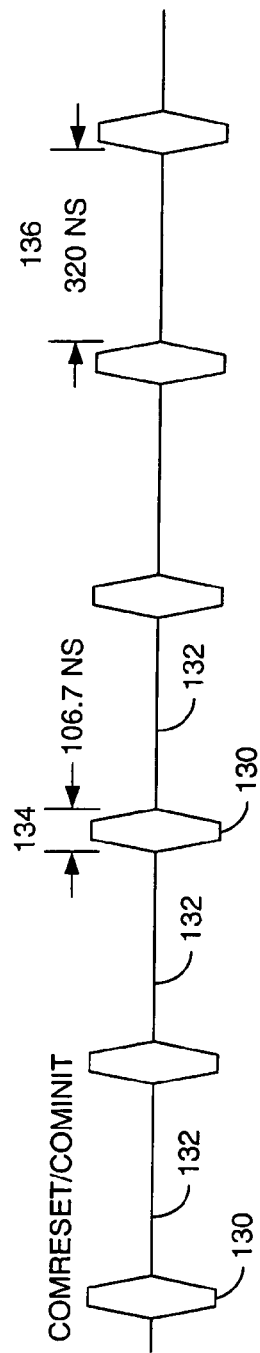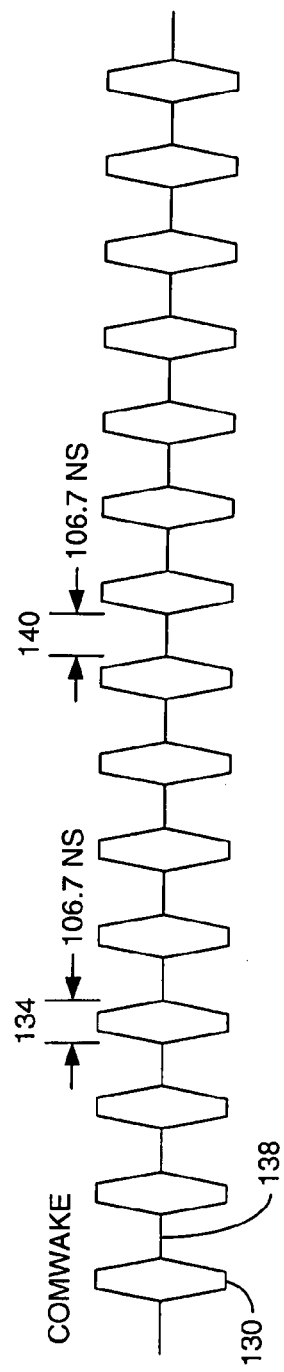
FIG. 2A
FIG. 2B

PROGRAMMABLE TRANSMISSION AND RECEPTION OF OUT OF BAND SIGNALS FOR SERIAL ATA

FIELD OF THE INVENTION

The present invention relates to a method and/or architecture for serial bus signaling generally and, more particularly, to programming burst durations and idle gap durations for out of band signaling.

BACKGROUND OF THE INVENTION

Serial Advanced Technology Attachment (ATA) buses uses Out of Band (OOB) signaling to establish communications across a serial interface. The OOB signaling is defined as bursts of transmission followed by idle gaps on transmission lines. Lengths of the bursts and lengths of the idle gaps are defined in the Serial ATA bus specification as exact amounts of time. The exact timing requirements depend on whether a reset signal, an initialization signal, or a wake up signal is being sent.

Conventional transmitters and receivers implement different logic to transmit and detect the OOB signaling resulting in slight variations from the exact timing requirements. Most Serial ATA bus cabling is non-shielded and thus a great amount of noise is often present on the transmission lines. Therefore, the received OOB signals are distorted versions of the transmitted OOB signals that may not be detected as valid OOB signals.

SUMMARY OF THE INVENTION

The present invention concerns an apparatus generally comprising a plurality of writeable registers, a control circuit, and a transmitter circuit. The writeable registers may be configured to store (i) a first burst value and (ii) a first gap value. The control circuit may be configured to generate an idle signal (i) in a transmit state for a first duration determined by the first burst value and (ii) in an idle state for a second duration determined by the first gap value in response to a first command signal. The transmitter circuit may be configured to (i) enable transmitting while the idle signal is in the transmit state and (ii) disable transmitting while the idle signal is in the idle state.

The objects, features and advantages of the present invention include providing an apparatus that may (i) allow out of band signal timing to be adjusted to meet the needs of an individual transmitter, (ii) allow out of band signal timing to be adjusted to meet the needs of an individual receiver, and/or (iii) provide limited immunity to induced noise.

BRIEF DESCRIPTION OF THE DRAWINGS

These and other objects, features and advantages of the present invention will be apparent from the following detailed description and the appended claims and drawings in which:

FIG. 2 is a graph of the out of band signal waveforms;

DETAILED DESCRIPTION OF THE PREFERRED EMBODIMENTS

Figure 1:
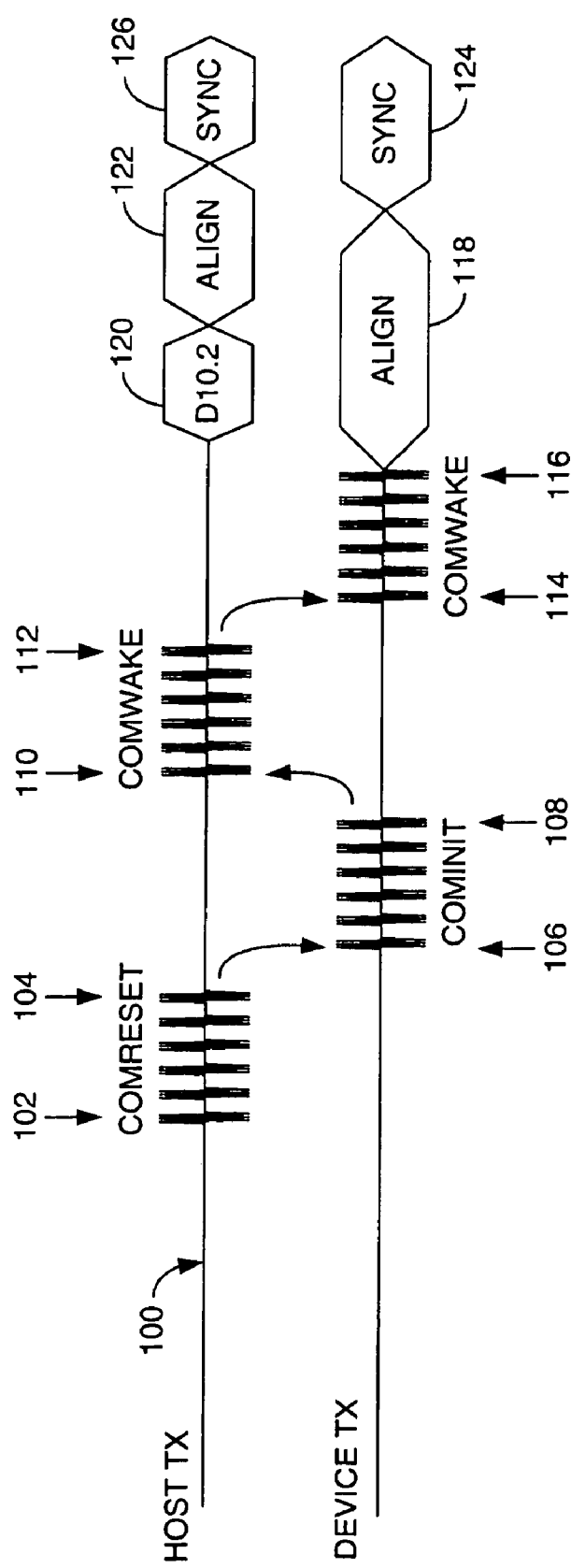
FIG. 1 is a graph of an out of band signaling sequence.

Referring to FIG. 1, a graph of a Serial Advanced Technology Attachment (ATA)/High Speed Serialized Advanced Technology Attachment bus Out of Band (OOB) signaling sequence is shown. The Serial ATA bus may be defined by a specification "Serial ATA/High Speed Serialized AT Attachment", published by the Serial ATA Workgroup Technical Editor, Santa Cruz, Calif., 2001. The Serial ATA/High Speed Serialized AT Attachment specification is hereby incorporated by reference in its entirety.

Initially, a host and a device may be powered and operating normally at a time 100. A reset condition in the host may cause the host to issue a reset signal (e.g., COMRESET) at a time 102. The signal COMRESET may comprise a string of at least six bursts with inter-burst temporal spacing. When the reset condition in the host ends, the host may stop transmitting the signal COMRESET and release the transmission lines to a quiescent condition at a time 104.

At a time 106, the device may respond to the signal COMRESET by transmitting an initialization signal (e.g., COMINIT). The signal COMINIT may comprise a string of at least six bursts with inter-burst temporal spacing. After transmitting the signal COMINIT, the device may release the bus to the quiescent condition at a time 108.

At a time 110, the host may respond to the signal COMINIT by transmitting a wake-up signal (e.g., COMWAKE). The signal COMINIT may comprise a string of at least six bursts with inter-burst temporal spacing. After the signal COMINIT has been transmitted, the host may release the bus at a time 112.

After the host finishes transmitting the signal COMWAKE, the device may respond with the signal COMWAKE at a time 114. The signal COMWAKE transmitted by the device may be the same as the signal COMWAKE transmitted by the host. At a time 116, the device may end transmission of the signal COMWAKE being transmitting a stream of alignment signals, as indicated by reference number 118.

The host may respond to the signal COMWAKE transmitted by the device by transmitting a predetermined signal having D10.2 characters, as indicated by reference number 120. Once the host locks to the alignment signal stream 118 the host may return the alignment signal to the device, as indicated by reference number 122. After the device has locked to the alignment signal 122 transmitted by the host, the device may transmit a synchronization primitive signal, as indicated by reference number 124, indicating a readiness to begin a login procedure. The host may return the synchronization primitives to the device, as indicated by reference number 126. Upon receipt of three back-to-back synchronization primitives, a communication link is established and the login procedure may begin.

Referring to FIG. 2A, a graph of the signals COMRESET and COMINIT is shown. The signal COMRESET and the signal COMINIT may have the same characteristics. The signals COMRESET/COMINIT generally comprise a string of at least six bursts 130. Consecutive bursts 130 may be temporally separated by an inter-burst gap 132.

The Serial ATA specification states that each burst 130 may be 160 unit intervals in length. A unit interval may be defined as the time required to transmit/receive one bit on the Serial ATA bus. For a generation 1 Serial ATA bus, the 160 unit intervals may result in a duration 134 of 106.7 nanoseconds (ns). The Serial ATA specification state that each gap 132 may be 480 unit intervals in length. For a generation 1 Serial ATA bus, the 320 unit intervals may result in a duration 136 of 320 ns.

Referring to FIG. 2B, a graph of the signal COMWAKE is shown. The signal COMWAKE generally comprises a series of at least six bursts 130. Consecutive bursts 130 may be temporally separated by an inter-burst gap 138.

The Serial ATA specification states that each gap 138 may be 160 unit intervals in length. For a generation 1 Serial ATA bus, the 160 unit intervals may result in a duration 140 of 106.7 ns. The signal COMWAKE may therefore have a 50% duty cycle with the duration 134 of the bursts 130 and the duration 140 of the gaps 134 each lasting the same amount of time.

Figure 3:
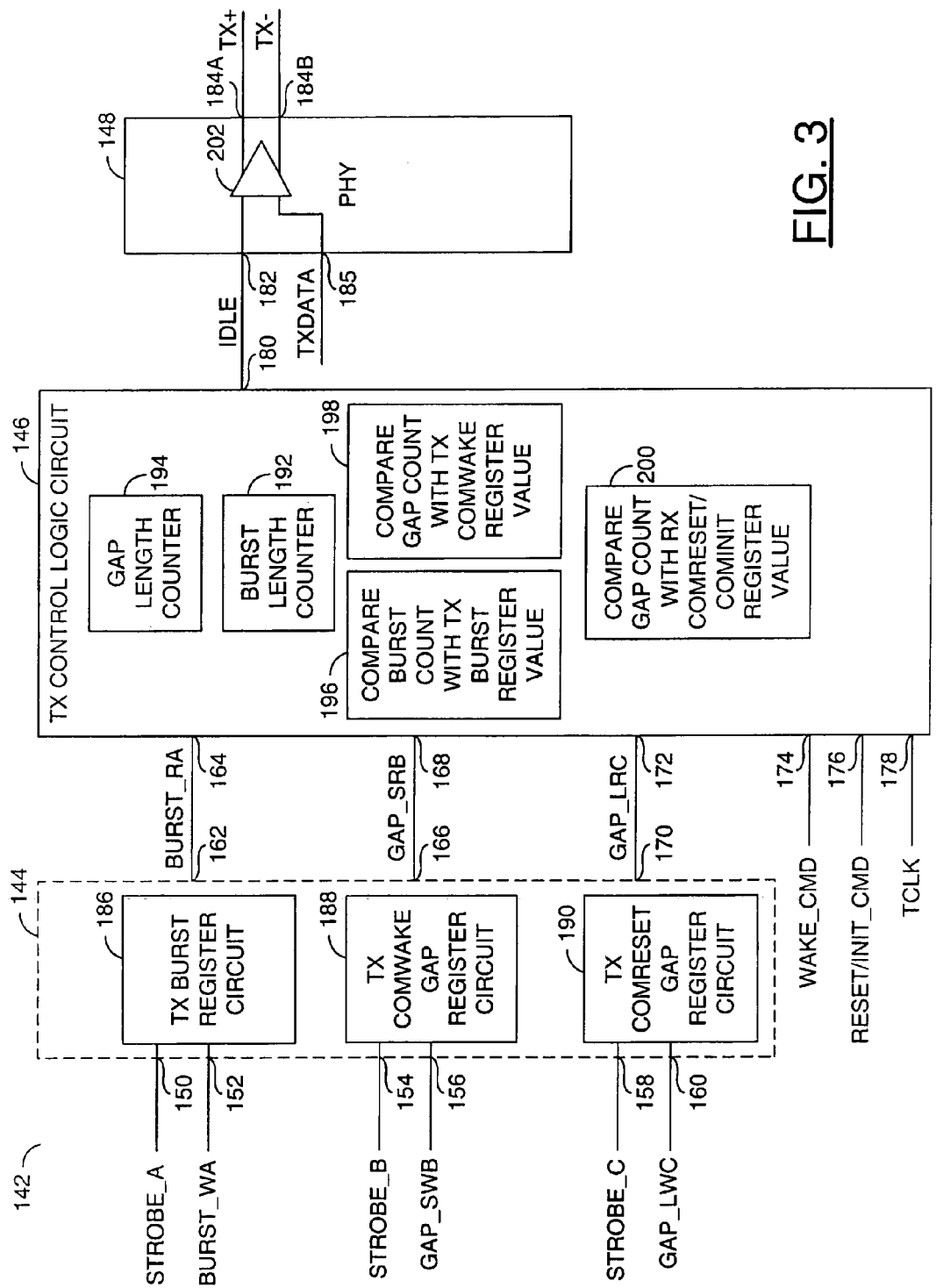
FIG. 3 is a partial block diagram of a transmit apparatus in accordance with a preferred embodiment of the present invention.

Referring to FIG. 3, a partial block diagram of an apparatus 142 is shown in accordance with a preferred embodiment of the present invention. The apparatus 142 may be implemented as a Serial ATA transmitter. The transmitter apparatus 142 may provide a robust interface to other Serial ATA receivers (FIG. 5) by allowing each of the durations 134, 136 and 140 to be individually programmed. Therefore, each of the OOB signals COMRESET, COMINIT, and COMWAKE may be software adjusted to be recognized and detected by a variety of Serial ATA receivers in a variety of environments.

The transmitter apparatus 142 generally comprises a circuit 144, a circuit 146, and a circuit 148. The circuit 144 may have an input 150 to receive a strobe signal (e.g., STROBE_A) from a microprocessor (not shown). An input 154 may be provided in the circuit 144 to receive a data signal (e.g., BURST_WA) from the microprocessor. The circuit 144 may have an input 154 to receive another strobe signal (e.g., STROBE_B) from the microprocessor. An input 156 may be provided in the circuit 144 to receive another data signal (e.g., GAP_SWB) from the microprocessor. The circuit 144 may have an input 158 to receive a strobe signal (e.g., STROBE_C) from the microprocessor. An input 160 may be provided in the circuit 144 to receive a data signal (e.g., GAP_LWC) from the microprocessor.

The circuit 144 may have an output 162 to present a data signal (e.g., BURST_RA) to an input 164 of the circuit 146. An output 166 may be provided in the circuit 144 to present a data signal (e.g., GAP_SRB) to an input 168 of the circuit 146. An output 170 may be provided in the circuit 144 to present another data signal (e.g., GAP_LRC) to an input 172 of the circuit 146.

An input 174 may be provided in the circuit 146 to receive a command signal (e.g., WAKE_CMD). An input 176 may be provided in the circuit 146 to receive another command signal (e.g., RESET/INIT_CMD). The circuit 146 may have an input 178 to receive a clock signal (e.g., TCLK).

The circuit 146 may have an output 180 to present a signal (e.g., IDLE) to an input 182 of the circuit 148. The circuit 148 may have an output 184A to present a signal (e.g., TX+) to a transmission line (not shown). The circuit 148 may have another output 184B to present a signal (e.g., TX–) to the transmission line. An input 185 may be provided in the circuit 148 to receive a transmit data signal (e.g., TXDATA).

The circuit 144 may be implemented as a register circuit. The register circuit 144 may receive and store the data signals BURST_WA, GAP_SWB and GAP_LWC as written or programmed from the microprocessor. The signal BURST_WA may carry a transmit burst value. The signal GAP_SWB may carry a short transmit gap value. The signal GAP_LWC may carry a long transmit gap value. The microprocessor may write to the register circuit 144 using the strobe signals STROBE_A, STROBE_B, and STROBE_C for the signal BURST_WA, GAP_SWB, and GAP_LWC respectively.

The circuit 146 may be implemented as a transmission control logic circuit. The transmission control logic circuit 146 may be configured to generate the signal IDLE in a transmit state and an idle state in response to the signals BURST_RA, GAP_SRB, GAP_LRC, WAKE_CMD, RESET/INIT_CMD and TCLK. In particular, the transmission control logic circuit 146 may alternate the signal IDLE between the transmit state and the idle state while one of the command signals WAKE_CMD or RESET/INIT_CMD is in an active state to generate OOB signaling. While both the command signals WAKE_CMD and RESET/INIT_CMD are in an inactive state, the circuit 146 may present the signal IDLE in the transmit state.

A time duration that the signal IDLE spends in the transmit state may be proportional to the transmit burst value conveyed by the signal BURST_RA. In particular, the time duration of the signal IDLE in the transmit state may equal the transmit burst value times a period of the clock signal TCLK. A time duration that the signal IDLE spends in the idle state may be proportional to either (i) the short transmit gap value or (ii) the long transmit gap value. While the signal WAKE_CMD is active, the time duration of the signal IDLE in the idle state may equal a product of the short transmit gap value times the period of the clock signal TCLK. While the signal RESET/INIT_CMD is active, the time duration of the signal IDLE in the idle state may equal a produce to the long transmit gap value times the period of the clock signal TCLK.

The circuit 148 may be implemented as a physical layer or front end transmitter circuit. The transmitter circuit 148 may be configured to transmit the signals TX+ and TX– in response to the data signal TXDATA and the signal IDLE. While the signal IDLE is in the transmit state, the transmitter circuit 148 may transmit the signals TX+ and TX– as a differential representation of the signal TXDATA. While the signal IDLE is in the idle state, the transmitter circuit 148 may present the signals TX+ and TX– in a quiescent condition.

The register circuit 144 generally comprises two or more writeable registers. A transmit burst register 186 may be configured to store the transmit burst value as written by the signal BURST_WA. A transmit COMWAKE gap register 188 may be configured to store the short transmit gap value as written by the signal GAP_SWB. A transmit COMRESET/COMINIT gap register 190 may be configured to store the log transmit gap value as written by the signal GAP_LWC.

The transmission control logic circuit 146 generally comprises a counter circuit 192, a counter circuit 194, a compare circuit 196, another compare circuit 198, and an optional compare circuit 200. The counter circuit 192 may be implemented as a burst length counter circuit. The burst length counter circuit 192 may be configured to generate a burst count equal to a number of cycles of the clock signal TCLK starting from (i) either of the command signals WAKE_CMD or RESET/INIT_CMD transitioning from the inactive state to the active state or (ii) the signal IDLE transitioning from the idle state to the transit state while at least one of the command signals WAKE_CMD or RESET/

INIT_CMD is active. In other words, the burst count may begin at (i) a start of an OOB signal and (ii) and an end of each gap duration. While both of the command signals WAKE_CMD and RESET/INIT_CMD are in the inactive state, the transmission control logic circuit 146 may release the signal IDLE to the transmit state.

The compare circuit 196 may be implemented as a burst length compare circuit. The burst length compare circuit 196 may compare the burst count of the burst length count circuit 192 with the transmit burst value stored in the TX burst register 186. When the burst count equals the transmit burst value the transmission control logic circuit 146 may transition the signal IDLE from the transmit state to the idle state.

The counter 194 may be implemented as a gap length counter circuit. The gap length counter circuit 194 may be configured to generate a gap count equal to a number of cycles of the clock signal TCLK starting from when the burst compare circuit 196 matches the burst count to the transmit burst value. In other words, the gap counter may begin at an end of the each burst duration.

The compare circuit 198 may be implemented as a gap compare circuit. The gap compare circuit 198 may be configured to compare the gap count of the gap length counter circuit 194 with the short transmit gap value while the command signal WAKE_CMD is active. When the gap count equals the short transmit gap value the transmission control logic circuit 146 may transition the signal IDLE from the idle state to the transmit state.

The compare circuit 200 may be implemented as another gap compare circuit. The gap compare circuit 200 may be configured to compare the gap count with the long transmit gap value while the command signal RESET/INIT_CMD is active. When the gap count equals the long transmit gap value the transmission control logic circuit 146 may transition the signal IDLE from the idle state to the transmit state. The burst length counter circuit 192 and the gap length counter circuit 194 may continue to alternate counting burst durations and gap durations for the signal IDLE as long as one of the command signals WAKE_CMD or RESET/INIT_CMD remains in the active state.

The transmitter circuit 148 generally comprises a line driver 202. The line driver 202 may be implemented as a differential line driver. The line driver 202 may be enabled to drive the signals TX+ and TX− onto the transmission line while the signal IDLE is in the transmit state. The line driver 202 may be disabled from transmitting while the signal IDLE is in the idle state.

Figure 4:
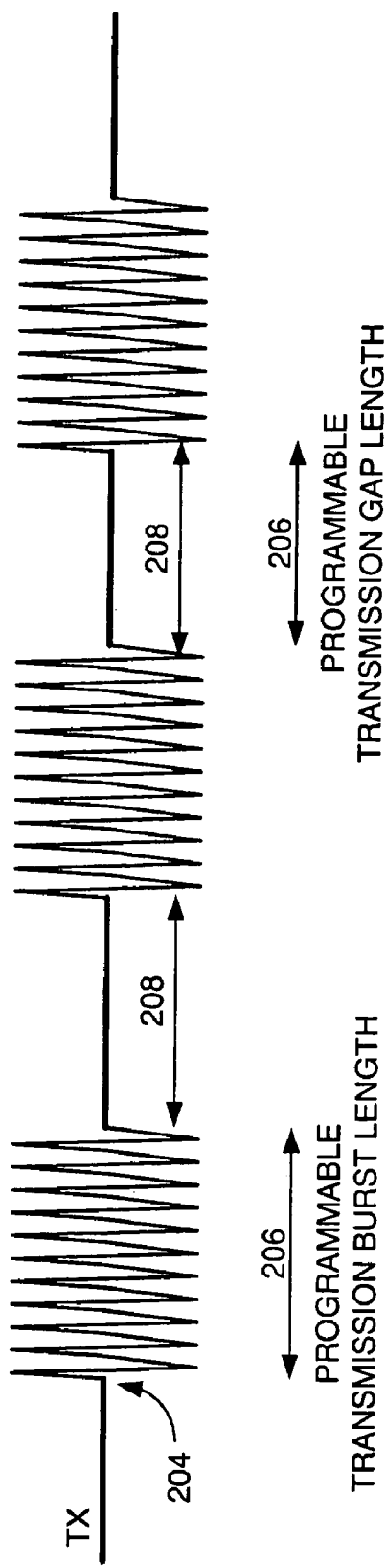
FIG. 4 is a graph of a programmed transmission signal waveform.

Referring to FIG. 4, a drawing of the signal TX as a function of time is shown. The signal TX may be at the quiescent condition at a time 204 when one of the command signals WAKE_CMD or RESET/INIT_CMD becomes active. For a burst duration 206, the signal TX may be active. Following the burst duration 206, the signal TX may return to the quiescent condition for a gap duration 208. A cycle of a burst duration 206 followed by a gap duration 208 may be repeated as necessary to meet the design criteria of a particular application. For a Serial ATA application, there may be at least six burst durations 206 each temporally separated by the gap duration 208.

The burst durations 206 may have a programmable length as determined by the transmit burst value. The burst durations 206 may be defined in the Serial ATA specification as 160 unit intervals (106.7 nanoseconds). However, the programmable length of the burst duration 206 may deviate from the 160 unit intervals in either direction in the present invention. For example, the burst duration 206 may be programmable by ±10% resulting in a range of 144 to 176 unit intervals or bit transmission periods. Other programmable ranges such as ±1% and ±5% may be implemented to meet the design criteria of a particular application.

The gap durations 208 may have one or more programmable lengths. The gap duration 208 may have a short programmable length as determined by the short transmit gap value. The gap duration 208 for the signal COMWAKE may be defined in the Serial ATA specification as 160 unit intervals, same as the burst duration 206. Likewise, the programmable length of the gap duration 208 may deviate from the 160 unit intervals in either direction.

The gap duration 208 may have a long programmable length as determined by the long transmit gap value. The gap duration 208 of the signals COMRESET and COMINIT may be defined in the Serial ATA specification as 480 unit intervals (320 nanoseconds). However, the programmable gap length 208 may deviate from the 480 unit intervals in either direction in the present invention. For example, the gap duration 208 may be programmable by ±10% resulting in a range of 432 to 528 unit intervals or bit transmission periods. Other programmable ranges such as ±1% and ±5% may be implemented to meet the design criteria of a particular application.

Figure 5:
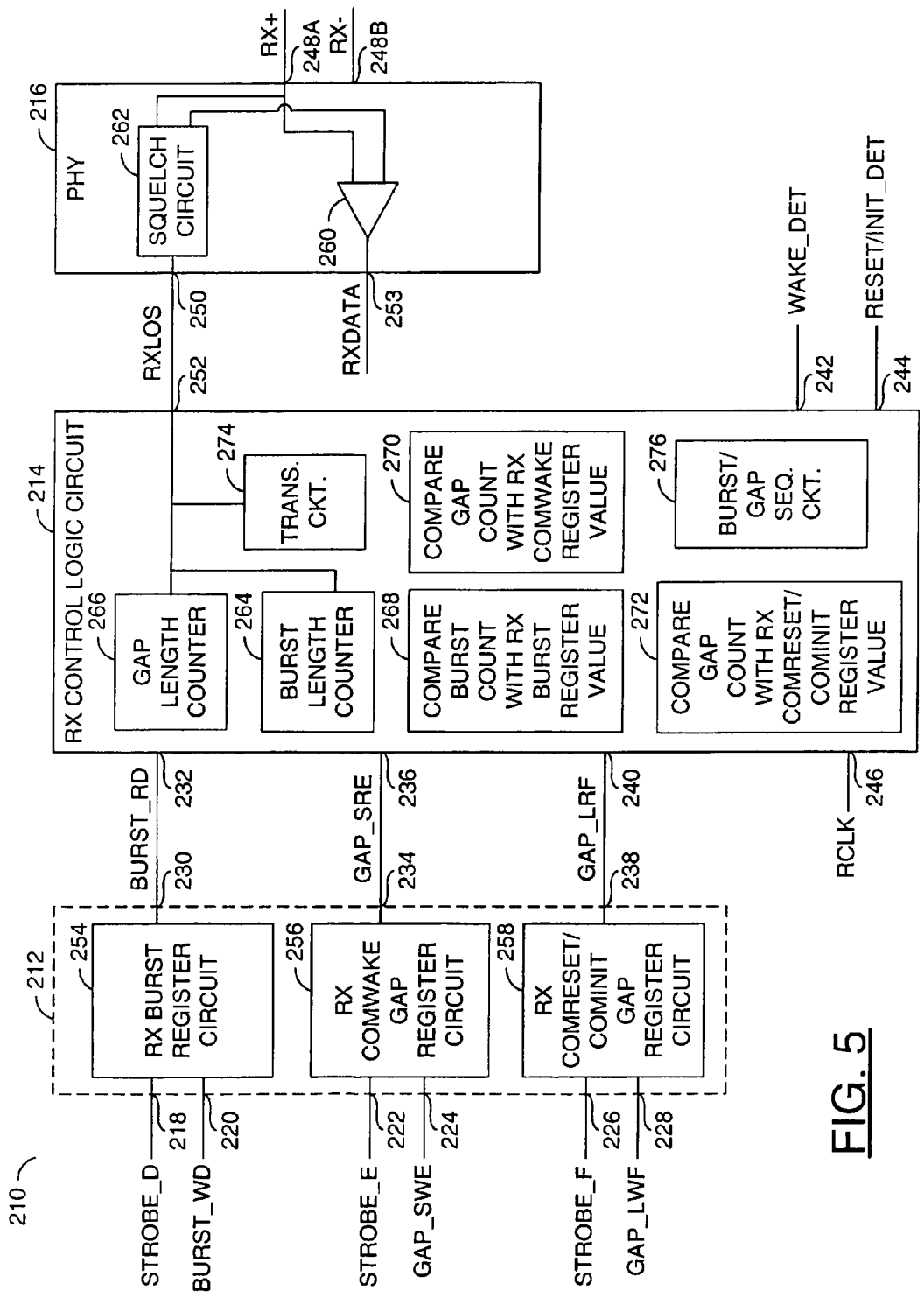
FIG. 5 is a partial block diagram of a receive apparatus in accordance with a preferred embodiment of the present invention.

Referring to FIG. 5, a partial block diagram of an apparatus 210 is shown in accordance with a preferred embodiment of the present invention. The apparatus 210 may be implemented as a Serial ATA receiver. The receiver apparatus 210 may provide a robust interface to other Serial ATA transmitters (FIG. 3) by allowing detection for each of the durations 134, 136 and 140 to be individually programmed. Therefore, detection criteria for the OOB signals COMRESET, COMINIT, and COMWAKE may be adjusted to be recognized from a variety of Serial ATA transmitters in a variety of environments.

The receiver apparatus 210 generally comprises a circuit 212, a circuit 214, and a circuit 216. The circuit 212 may have an input 218 to receive a strobe signal (e.g., STROBE_D) from a microprocessor (not shown). An input 220 may be provided in the circuit 212 to receive a data signal (e.g., BURST_WD) from the microprocessor. The circuit 212 may have an input 222 to receive another strobe signal (e.g., STROBE_E) from the microprocessor. An input 224 may be provided in the circuit 212 to receive another data signal (e.g., GAP_SWE) from the microprocessor. The circuit 212 may have an input 226 to receive a strobe signal (e.g., STROBE_F) from the microprocessor. An input 228 may be provided in the circuit 212 to receive a data signal (e.g., GAP_LWF) from the microprocessor.

The circuit 212 may have an output 230 to present a data signal (e.g., BURST_RD) to an input 232 of the circuit 214. An output 234 may be provided in the circuit 212 to present a data signal (e.g., GAP_SRE) to an input 236 of the circuit 214. An output 238 may be provided in the circuit 212 to present another data signal (e.g., GAP_LRF) to an input 240 of the circuit 214.

An output 242 may be provided in the circuit 214 to present a detected signal (e.g., WAKE_DET). An output 244 may be provided in the circuit 214 to present another detect signal (e.g., RESET/INIT_DET). The circuit 214 may have an input 246 to receive a clock signal (e.g., RCLK).

The circuit 216 may have an input 248A to receive a signal (e.g., RX+) from the transmission line (not shown). The circuit 216 may have another input 248B to receive a signal (e.g., RX−) from the transmission line. The circuit 216 may have an output 250 to present a signal (e.g., RXLOS) to an input 252 of the circuit 214. The circuit 216 may have an output 253 to present a received data signal (e.g., RXDATA).

The circuit 212 may be implemented as a register circuit. The register circuit 212 may receive and store the data signals BURST_WD, GAP_SWE and GAP_LWF as written or programmed from the microprocessor. The signal BURST_WD may carry a receive burst value. The signal GAP_SWE may carry a short receive gap value. The signal GAP_LWF may carry a long receive gap value. The microprocessor may write to the register circuit 212 using the strobe signals STROBE_D, STROBE_E, and STROBE_F for the signal BURST_WD, GAP_SWE, and GAP_LWF respectively.

The circuit 214 may be implemented as a receive control logic circuit. The receive control logic circuit 214 may be configured to generate the signal WAKE_DET in (i) the active state when a valid OOB signal COMWAKE has been detected on the transmission line and (ii) the inactive state otherwise. The receive control logic circuit 214 may be configured to generate the signal RESET/INIT_DET in (i) the active state when a valid OOB signal COMRESET or COMINIT has been detected on the transmission line and (ii) the inactive state otherwise.

Detecting a valid OOB signal COMWAKE, COMRESET and COMINIT may be defined by the Serial ATA specification as at least four valid bursts with valid inter-burst gaps of the appropriate length. The receive control logic circuit 214 may allow for adjustments to the definitions of a valid burst and a valid gap for the signals COMWAKE, COMRESET and COMINIT using the signals BURST_RD, GAP_SRE and GAP_LRF. The signal RXLOS may be implemented as a status signal. The status signal RXLOS may have a signal-present (SPR) state when the circuit 216 detects a presence of valid signals RX+ and RX− on the transmission line. The status signal RXLOS may have a loss-of-signal (LOS) state when the circuit 216 detects a loss of the signals RX+ or RX− from the transmission line.

A valid received burst in the OOB signals COMWAKE, COMRESET and COMINIT may be determined by the receive burst value, a period of the clock signal RCLK, and a time duration that the status signal RXLOS is in the SPR state. A valid received gap in the signal COMWAKE may be proportional to the short receive gap value. In particular, a received gap in the signal COMWAKE may be valid if a time duration that the status signal RXLOS is in the LOS state equals a product of the short receive gap value times a period of the clock signal RCLK. A valid received gap in the signals COMRESET and COMINIT may be proportional to the long receive gap value. In particular, the received gap in the signals COMRESET and COMINIT may be valid if a time duration that the status signal RXLOS is in the LOS state equals a produce of the long gap value times the period of the clock signal RCLK.

The circuit 216 may be implemented as a physical layer or front end receiver circuit. The receiver circuit 216 may be configured to receive the signals RX+ and RX−. The status signal RXLOS may be generated and presented by the receiver circuit 216 in response to the signals RX+ and RX−. The data signal RXDATA may also be generated and presented in response to the signals RX+ and RX−. While the transmission line is in the quiescent condition, the status signal RXLOS may be presented in the LOS state.

The register circuit 212 generally comprises two or more writeable registers. A receive burst register 254 may be configured to store the receive burst value as written by the signal BURST_WD. A receive COMWAKE gap register 256 may be configured to store the short receive gap value as written by the signal GAP_SWE. A receive COMRESET/COMINIT gap register 258 may be configured to store the long receive gap value as written by the signal GAP_LWF.

The receiver circuit 216 generally comprises a line receiver 260 and a squelch circuit 262. The line receiver 260 may be implemented as a differential receiver to receive the signals RX+ and RX−. The differential receiver 260 may generate and present the data signal RXDATA representative of the signals RX+ and RX−.

The squelch circuit 262 may receive the signals RX+ and RX−. The squelch circuit 262 may generate and present the status signal RXLOS in the LOS state while the signals RX+ and/or RX− are not valid or absent. The squelch circuit 262 may present the status signal RXLOS in the SPR state while both the signals RX+ and RX− are present and valid. Therefore, a burst on the signals RX+ and RX− may appear as a burst of the status signal RXLOS in the SPR state. Likewise, a gap on the signals RX+ and RX− may appear as a gap of the status signal RXLOS.

The receive control logic circuit 214 generally comprises a counter circuit 264, a counter circuit 266, a compare circuit 268, another compare circuit 270, an optional compare circuit 272, a circuit 274, and a circuit 276. The counter circuit 264 may be implemented as a burst length counter circuit. The burst length counter circuit 264 may be configured to generate a burst count equal to a number of cycles of the clock signal RCLK that the status signal RXLOS is in the SPR state.

The compare circuit 268 may be implemented as a burst length compare circuit. The burst length compare circuit 268 may compare the burst count of the burst length count circuit 264 with the receive burst value. The burst length compare circuit 268 may notify the circuit 276 if the burst count does/does not equal the receive burst value.

The counter 266 may be implemented as a gap length counter circuit. The gap length counter circuit 266 may be configured to generate a gap count equal to a number of cycles of the clock signal RCLK that the status signal RXLOS is in the LOS state. The gap count may be presented to the circuits 270 and 272.

The compare circuit 270 may be implemented as a gap length compare circuit. The gap length compare circuit 270 may compare the gap count with the short receive gap value. The gap length compare circuit 270 may notify the circuit 276 if the gap count does/does not equal the short receive gap value.

The compare circuit 272 may be implemented as another gap length compare circuit. The gap length compare circuit 272 may compare the gap count with the long receive gap value. The gap length compare circuit 272 may notify the circuit 276 if the gap count does/does not equal the long receive gap value.

The circuit 274 may be implemented as a transition detection circuit. The transition detection circuit 274 may be configured to detect when the status signal RXLOS transitions between the SPR state and the LOS state. The transition detection circuit 274 may notify the circuit 276 of each detected transition of the status signal RXLOS.

The circuit 276 may be implemented as a sequence validation circuit. The circuit 276 may compare a sequence of valid bursts and valid gaps as determined by the burst length compare circuit 268, the gap length compare circuit 270, the gap length compare circuit 272, and the transition detection circuit 274. If a proper sequence of the valid bursts and the valid gaps is detected for the signal COMWAKE, then the sequence validation circuit 276 may generate and present the detect signal WAKE_DET in the active state. If a proper sequence of the valid bursts and the valid gaps is detected for the signal COMRESET or the signal COM-WAKE, then the sequence validation circuit 276 may generate and present the signal RESET/INIT_DET in the active state.

A valid burst may be detected when the burst length compare circuit 268 indicates that the burst count equals the receive burst value while the transition detection circuit 274 simultaneously indicates that the status signal RXLOS has just transitioned from the SPR state to the LOS state. A valid gap may be detected when one of the gap length compare circuits 270 or 272 indicates that the gap count equals the appropriate receive gap value while the transition detection circuit 274 simultaneously indicates that the status signal RXLOS has just transitioned from the LOS state to the SPR state. Other designs of the circuit 266, 268, 270, 272, 274 and 276 may be implemented to meet the design criteria of a particular application.

Figure 6:
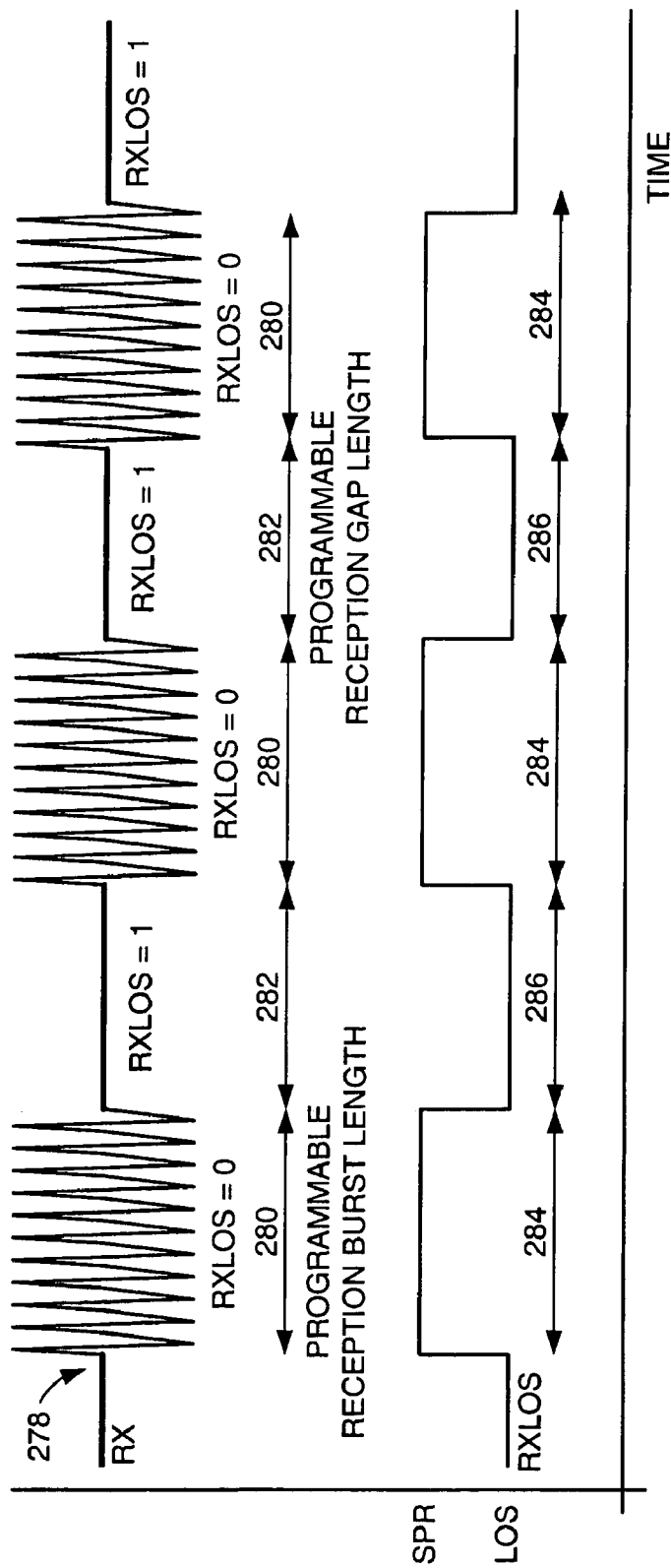
FIG. 6 is a graph of signals for a programmable out of band reception.

Referring to FIG. 6, a drawing of the signals RX and RXLOS as a function of time are shown. The signal RX may be at the quiescent condition at a time 278 when a voltage first appears on the transmission line. The signals COM-WAKE, COMRESET, and COMINIT may begin with a burst having a burst duration 280. Following the burst duration 280, the signal RX may return to the quiescent condition for a gap duration 282. A sequence of the burst durations 280 and the gap durations 282 may be repeated as defined in the Serial ATA specification. The Serial ATA specification may require that at least four valid bursts separated by valid gaps be present to detect an OOB signal. The receive control logic circuit 214 may adjust the definition of the valid bursts and the valid gaps as programmed into the register circuit 212.

The status signal RXLOS may mirror the burst durations 280 and the gap durations 282 of the signal RX. In particular, status signal RXLOS may be in the SPR state for a "burst" duration 284 that matches in time the burst duration 280 of the signal RX. Furthermore, the status signal RXLOS may be in the LOS state for a "gap" duration 286 that matches in time the gap duration 282 of the signal RX.

The receive burst value may determine in a given burst duration 284 is valid. The burst duration 280 may be defined in the Serial ATA specification as 160 unit intervals (106.7 nanoseconds). However, the programmable length for detecting the valid burst duration 284 may deviate from the 160 unit intervals in either direction in the present invention. For example, the valid burst duration 284 may be programmable by ±10% resulting in a range of 144 to 176 unit intervals or bit transmission periods. Other programmable ranges such as ±1% and ±5% may be implemented to meet the design criteria of a particular application.

The short receive gap value may determine if a given gap durations 286 is valid. The valid gap duration 286 may have a short programmable length as determined by the short receive gap value. The gap duration 282 for the signal COMWAKE may be defined 10, in the Serial ATA specification as 160 unit intervals, same as the burst duration 260. However, the programmable length of the valid gap duration 286 may deviate from the 160 unit intervals in either direction in the present invention.

The long receive gap value may determine if a given gap duration 286 is valid. The gap duration 282 for the signals COMRESET and COMINIT may be defined in the Serial ATA specification as 480 unit intervals (320 nanoseconds). However, the receive control logic circuit 214 may be programmed to detect as valid a gap duration 286 deviated from the 480 unit intervals in either direction in the present invention. For example, the gap duration 208 may be programmable by ±10% resulting in a range of 432 to 528 unit intervals or bit reception periods. Other programmable ranges such as ±1% and ±5% may be implemented to meet the design criteria of a particular application.

One of ordinary skill in the art may appreciate that variations of the present invention may be implemented without deviating from the scope of the present invention. For example, the transmitter apparatus 142 may be combined with the receiver apparatus 210 to form a transceiver apparatus. Such a transceiver apparatus may combine the transmitter circuit 148 and the receiver circuit 216. The transmission control logic circuit 146 may also be combined with the receive control logic circuit 214 to form a unified control logic circuit, possibly using a single clock signal. In one embodiment, all six registers 186, 188, 190, 254, 256 and 258 may retained to allow independent programming of the received signals RX+ and RX− as well as the transmitted signals TX+ and TX−. In another embodiment, some of the registers 186, 188, 190, 254, 256 and 258 may be combined.

As used herein, the term "simultaneously" is meant to describe events that share some common time period but the term is not meant to be limited to events that begin at the same point in time, end at the same point in time, or have the same duration.

The various signals of the present invention are generally active (e.g., a digital HIGH, or 1) or inactive (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a plurality of writeable registers configured to store (i) a first burst value and (ii) a first gap value;
   a control circuit configured to generate an idle signal (i) in a transmit state for a first duration determined by said first burst value and (ii) in an idle state for a second duration determined by said first gap value in response to a first command signal; and
   a transmitter circuit configured to (i) enable transmitting while said idle signal is in said transmit state and (ii) disable transmitting while said idle signal is in said idle state.

2. The apparatus according to claim 1, wherein (A) said writeable registers are further configured to store a second gap value and (B) said control circuit is further configured to generate said idle signal (i) in said transmit state for said first duration and (ii) in said idle state for a third duration determined by said second gap value in response to a second command signal.

3. The apparatus according to claim 2, further comprising:
   a second plurality of writeable registers configured to store (i) a second burst value and (ii) a third gap value;
   a receiver circuit configured to generate a status signal having a loss state and a presence state in response to a received signal; and
   a second control circuit configured to generate a first detection signal in response to detecting a predetermined number of valid bursts each separated by a valid gap in said status signal, wherein (i) each said valid burst has a fourth duration in said presence state proportional to said second burst value and (ii) each said valid gap has a fifth duration in said loss state proportional to said third gap value.

4. The apparatus according to claim 3, wherein (A) said second writeable registers are further configured to store a fourth gap value and (B) said second control circuit is further configured to generate a second detection signal in response to detecting said predetermined number of said valid bursts each separated by a second valid gap in said status signal, wherein said second valid gap has a sixth duration in said loss state proportional to said fourth gap value.

5. The apparatus according to claim ±3, wherein said control circuit comprises:
   a burst counter configured to count a first number of clock cycles while said idle signal is in said transmit state; and
   a first compare circuit configured to compare said first number of clock cycles to said first burst value, wherein said control circuit is further configured to set said idle signal to said idle state in response to said first number of clock cycles equaling said first burst value.

6. The apparatus according to claim 5, wherein said control circuit further comprises:
   a gap counter configure to count a second number of clock cycles while said idle signal is in said idle state; and
   a second compare circuit configured to compare said second number of clock cycles to said first gap value, wherein said control circuit is further configured to set said idle signal in said transmit state in response to said second number of clock cycles equaling said second burst value.

7. The apparatus according to claim 6, wherein said control circuit further comprises a third compare circuit configured to compare said second number of clock cycles to a second gap value, wherein said control circuit is further configured to set said idle signal to said transmit state in response to said second number of clock cycles equaling said second gap value.

8. The apparatus according to claim 1, wherein said first duration is variable in a first range from 144 to 176 bit transmit periods in response to said first burst value.

9. The apparatus according to claim 8, wherein said second duration is variable in a second range from 432 to 528 bit transmit periods in response to said first gap value.

10. An apparatus comprising:
    a plurality of writeable registers configured to store (i) a first burst value and (ii) a first gap value;
    a receiver circuit configured to generate a status signal having a loss state and a presence state in response to a received signal; and
    a control circuit configured to generate a first detection signal in response to detecting a predetermined number of valid bursts each separated by a valid gap in said status signal, wherein (i) each said valid burst has a first duration in said presence state proportional to said first burst value and (ii) said each valid gap has a second duration in said loss state proportional to said first gap value.

11. The apparatus according to claim 10, wherein (A) said writeable registers are further configured to store a second gap value and (B) said control circuit is further configured to generate a second detection signal in response to detecting said predetermined number of said valid bursts each separated by a second valid gap in said status signal, wherein said second valid gap has a third duration in said loss state proportional to said second gap value.

12. The apparatus according to claim 11, further comprising:
    a second plurality of writeable registers configured to store (i) a second burst value, (ii) a third gap value and (iii) a fourth gap value;
    a second control circuit configured to generate an idle signal (A) (i) in a transmit state for a fourth duration determined by said second burst value and (ii) in an idle state for a fifth duration determined by said third gap value in response to a first command signal and (B) (i) in said transmit state for said fourth duration and (ii) in said idle state for a sixth duration determined by said fourth gap value in response to a second command signal; and
    a transmitter circuit configured to (i) enable transmitting while said idle signal is in said transmit state and (ii) disable transmitting while said idle signal is in said idle state.

13. The apparatus according to claim 10, wherein said control circuit comprises:
    a burst counter configured to count a first number of clock cycles while said status signal is in said present state; and
    a first compare circuit configured to indicate one of said valid bursts when said first number of clock cycles equals said first burst value.

14. The apparatus according to claim 13, wherein said control circuit further comprises:
    a gap counter configured to count a second number of clock cycles while said status signal is in said loss state; and
    a second compare circuit configured to indicate one of said valid gaps when said second number of clock cycles equals said first gap value.

15. The apparatus according to claim 14, wherein said control circuit further comprises a third compare circuit configured to indicate a second valid gap when said second number of clock cycles equals a gap number.

16. The apparatus according to claim 15, wherein said control circuit further comprises a sequence circuit configure to (i) generate said first detection signal in response to detecting said predetermined number of said valid bursts each separated by said valid gap in said status signal and (ii) generate a second detection signal in response to detecting said predetermined number of said valid bursts each separated by said second valid gap in said status signal.

17. The apparatus according to claim 16, further comprising a detection circuit configured to detect a transition of said status signal between said present state and said loss state to identify a first completion of said first duration and a second completion of said second duration.

18. The apparatus according to claim 10, wherein said first duration is variable in a first range from 144 to 176 bit reception periods in response to said first burst value.

19. The apparatus according to claim 18, wherein said second duration is variable in a second range from 432 to 528 bit reception periods in response to said first gap value.

20. An apparatus comprising:
    means for writeably storing (i) a first burst value and (ii) a first gap value;
    means for generating an idle signal (i) in a transmit state for a first duration determined by said first burst value and (ii) in an idle state for a second duration determined by said first gap value in response to a first command signal; and
    means for (i) enabling transmitting while said idle signal is in said transmit state and (ii) disabling transmitting while said idle signal is in said idle state.

* * * * *